United States Patent Office 2,993,042
Patented July 18, 1961

2,993,042
16β-HYDROXY - 9,11 - SUBSTITUTED-4-PREGNENE AND 1,4-PREGNADIENE-3,20-DIONES AND ESTERS THEREOF
Seymour Bernstein and Milton D. Heller, New City, N.Y., and Stephen M. Stolar, Fairlawn, N.J., assignors to American Cyanamid Company, New York, N.Y., a corporation of Maine
No Drawing. Filed Aug. 4, 1959, Ser. No. 831,461
14 Claims. (Cl. 260—239.55)

This invention relates to a new process for the preparation of triamcinolone (9α-fluoro - 16α - hydroxy-prednisolone) and new products formed in the process.

In U.S. Patent 2,789,118 the above product is described and claimed. It is a highly active glucocorticoid and also causes diuresis which is desirable in steroid therapy. This product is in commercial use and has received wide acceptance in the fields of rheumatology and dermatology. A new process for the preparation of 9α-fluoro-16α-hydroxy-prednisolone is therefore desirable.

This application is a continuation-in-part of our copending application Serial No. 774,153, filed November 17, 1958, which is now abandoned.

The process of the present invention can be illustrated by the following flowsheet starting with, for example, 21-acetoxy-16α,17α - epoxy - 4,9(11) - pregnadiene-3,20-dione described in the literature.

FLOWSHEET

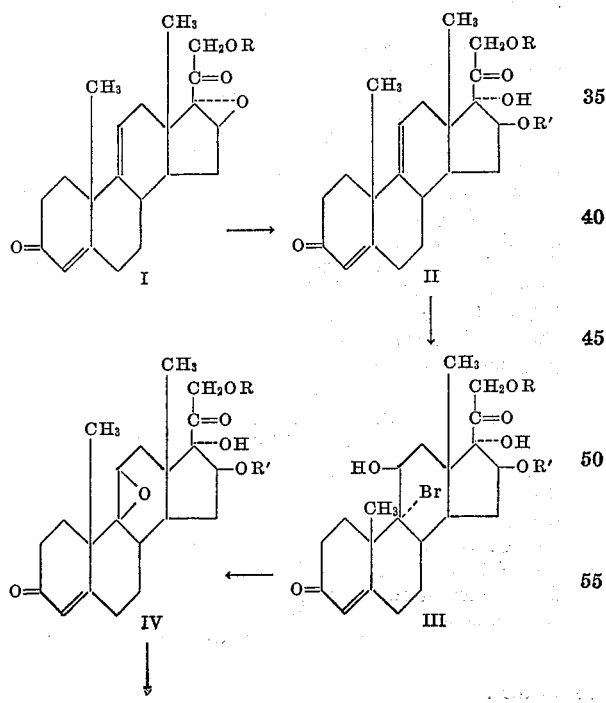

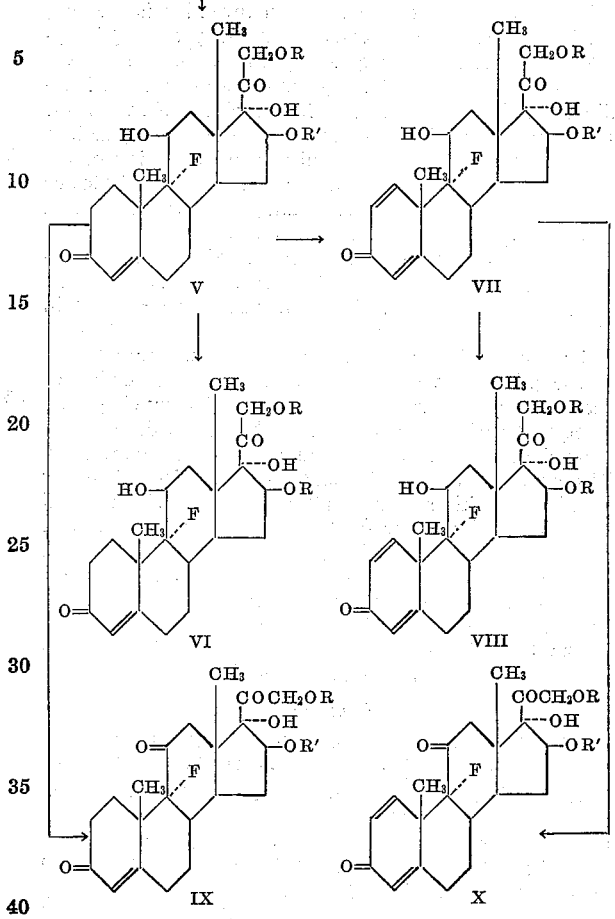

In the above flowsheet R and R' are lower alkanoyl radicals.

In the above synthesis the novel steroids can be illustrated by the following general formula:

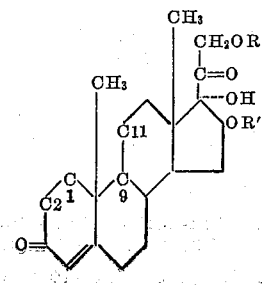

in which R and R' are hydrogen and lower alkanoyl radicals, $>C_9$—$C_{11}$— is selected from the group consisting of

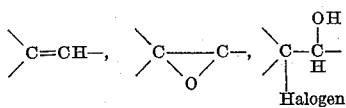

and

groups and —$C_1$—$C_2$— is selected from the group consisting of —$CH_2$—$CH_2$— and —CH=CH— groups.

These compounds are useful as intermediates in the preparation of the highly active glucocorticoid, triamcinolone (Compd. VIII). In some instances they also have diuretic activity in themselves.

The novel process of the present invention is the conversion of the 16β,21-dilower alkanoyloxy or dihydroxy-9α-halo-11β,17α-dihydroxy-4-pregnene-3,20-dione into 9α-halo - 11β,16α,17α,21-tetrahydroxy-1,4-pregnadiene-3,20-dione. This can be accomplished in either of two ways: (1) Conversion of the 4-pregnene to the 1,4-pregnadiene with an oxidizing agent and subsequent formation of the 16α-hydroxy group from the corresponding 16β-lower alkanoyloxy or hydroxy compound, and (2) Conversion of the 16β-lower alkanoyloxy group to the corresponding 16α-group and subsequent formation of the 1,4-pregnadiene from the corresponding 4-pregnene as shown in the flowsheet hereinbefore. The latter step is described in U.S. Patent No. 2,789,118.

The conversion of compound VII to compound VIII in the presence of alkali is an irreversible inversion of the 16β-acetoxy radical to the 16α-hydroxyl group. Acetylation of the latter produces the 16α,21-diacetate of triamcinolone and not compound VII. The conversion of compound VII to triamcinolone is carried out under alkaline conditions such as the presence of an alkali metal hydroxide, bicarbonate, carbonate, methoxide and the like in a solvent. The solvents can be methanol, ethanol, propanol, and so forth, or mixtures thereof. The product can be purified by partition chromatography as shown hereinafter in the examples.

The following examples illustrate in detail the process and products of the present invention.

*Example I*

PREPARATION OF 16β,21-DIACETOXY-17α-HYDROXY-4,9(11)-PREGNADIENE-3,20-DIONE

A solution of 0.5 g. of 21-acetoxy-16α,17α-epoxy-4,9(11)-pregnadiene-3,20-dione in 10 ml. of glacial acetic acid is treated with 1 ml. of a 20% (v./v.) solution of sulfuric acid in acetic acid and allowed to stand at room temperature for 24 hours. The resulting brown solution is poured into ice water and extracted several times with ethyl acetate. The combined extracts are washed with aqueous sodium bicarbonate and finally with water until the washings are neutral. The extract is dried over magnesium sulfate and evaporated. The resulting oil is partitioned on a diatomaceous earth column using the system petroleum ether (B.P. 90–100° C.) (5 parts): ethyl acetate (2 parts): methanol (3 parts) and water (2 parts). Hold-back volumes two and part of three are evaporated to give a white semi-solid which crystallizes from acetone-petroleum ether to give 280 mg. of product. Three crystallizations from acetone-petroleum ether gives 160 mg. of pure product: melting point 173–175° C. λ max.$^{23m\mu}$(ε15,700) (methanol).

*Example II*

PREPARATION OF 21-ACETOXY-16β-FORMYLOXY-17α-HYDROXY-4-PREGNENE-3,20-DIONE

A solution of 1.0 g. of 21-acetoxy-16α,17α-epoxy-4-pregnene-3,20-dione (Julian et al., J. Am. Chem. Soc. 72 5145 (1950) in 10 ml. of 98% formic acid containing 0.5 ml. of sulfuric acid is allowed to stand for four hours at room temperature. The reaction mixture is poured into water to yield a solid which is removed by filtration. Four crystallizations from acetone-petroleum ether gives 0.16 g.; melting point 185–187° C.

*Example III*

PREPARATION OF 21-ACETOXY-16β,17α-DIHYDROXY-4-PREGNENE-3,20-DIONE

To a solution of 1.0 g. of 16β,21-diacetoxy-17α-hydroxy-4-pregnene-3,20-dione [(Heusler et al. Chem. Berichte, 87: 1301 (1954)] in 25 ml. of methanol and 4 ml. of water at 10°, is added slowly, 2 ml. of concentrated hydrochloric acid. The reaction mixture is allowed to stand at room temperature for 17 hours and is then poured into water. The aqueous mixture is extracted with ethyl acetate, the combined extracts are washed with water until neutral, dried over magnesium sulfate and evaporated to dryness to give an oil.

The above oil is partitioned on a diatomaceous earth column using the solvent system, methylene chloride, ethyl acetate, ethylene glycol (7:1:2). Part of hold back volume one is evaporated until only ethylene glycol remains. On standing, crystals form and are removed by filtration and washed with water to give 0.17 g.; M.P. 184–188° C. Two crystallizations from acetone-petroleum ether yields 0.11 g.; M.P. 189–192° C.

*Example IV*

PREPARATION OF 21-ACETOXY-16β,17α-DIHYDROXY-4-PREGNENE-3,20-DIONE

To a solution of 0.25 g. of 21-acetoxy-16β-formyloxy-17α-hydroxy-4-pregnene-3,20-dione in 20 ml. of methanol, previously flushed with nitrogen, is added 2 ml. of a 5% solution of potassium bicarbonate in equal parts of methanol and water. The reaction mixture is allowed to stand for one hour at room temperature and is then neutralized with dilute acetic acid. The methanol is removed under reduced pressure at room temperature and the aqueous residue is extracted with methylene chloride. The combined extracts are washed with water, dried over magnesium sulfate and evaporated to give an oil. The above oil is partitioned on a diatomaceous earth column using the solvent system methylene chloride-ethylene glycol (1:1). The latter part of hold back volume one and part of hold back volume two are combined and evaporated. The residue is extracted with ethyl acetate and the combined extracts are washed with water, dried over magnesium sulfate and evaporated to give an oil. Crystallization from acetone-petroleum ether gives 70 mg.; 148–170° C. The infra-red spectrum is identical to the spectrum of the product of Example III.

The product isolated above (50 mg.) is dissolved in 3 ml. of pyridine and treated with 0.3 ml. of acetic anhydride overnight at room temperature. The acetylation mixture is evaporated to dryness. The residue is slurried with ether to give 25 mg.; 162–164° C. The infra-red spectrum is indentical to that of a previously characterized sample of 16β,21-diacetoxy-17α-hydroxy-4-pregnene-3,20-dione.

*Example V*

PREPARATION OF 9α-BROMO-16β,21-DIACETOXY-11β,17α-DIHYDROXY-4-PREGNENE-3,20-DIONE

To a solution of 1.64 g. of 16β,21-diacetoxy-17α-hydroxy-4,9(11)-pregnadiene-3,20-dione in 82 ml. of dioxane (peroxide free) and 16 ml. of water cooled to 15° C. is added 0.7 g. of N-bromoacetamide and 3.5 ml. of 10% aqueous perchloric acid. After standing for 30 minutes at room temperature, the solution is treated with aqueous sodium sulfite until the color is discharged and the solution becomes slightly alkaline. Dilution with water gives a semi-solid (1 g.) which is not purified further.

Example VI

PREPARATION OF 16β,21-DIACETOXY-17α-HYDROXY-9β,11β-EPOXY-4-PREGNENE-3,20-DIONE

To a solution of 1.0 g. of the bromohydrin of the example preceeding (5) in 500 ml. of ethanol is added 3.0 g. of dried potassium acetate and the mixture is refluxed for 24 hours. After evaporation, the residue is dissolved in ethyl acetate, washed several times with water, dried over magnesium sulfate and evaporated. The resulting oil is dissolved in 20 ml. of pyridine and treated with 4 ml. of acetic anhydride overnight at room temperature. The acetylation mixture is evaporated to give 0.65 g. of oil which is partitioned on a diatomaceous earth column using the system petroleum ether (B.P. 90–100° C.) (4 parts): ethyl acetate (2 parts): methanol (3 parts): and water (2 parts). Hold-back volumes three and the latter part of two are evaporated to give an oil which on treatment with acetone-petroleum ether gives 120 mg. of crystals. Three crystallizations from acetone-petroleum ether gives 60 mg. of desired product: M.P. 200–202° C. $\lambda$ max.$^{243-244m\mu}$ ($\epsilon$15,200) (methanol).

Example VII

PREPARATION OF 16β,21-DIACETOXY-9α-FLUORO-11β,17α-DIHYDROXY-4-PREGNENE-3,20-DIONE

To a solution of 200 mg. of the 9,11-epoxide prepared in Example III in 15 ml. of methylene chloride at −60° C. is added a solution of 1 ml. of hydrogen fluoride in 2 ml. of tetrahydrofuran at −60° C. The mixture is allowed to stand at −5° C. for 4 hours and then poured slowly into a mixture of 50 ml. of saturated, aqueous sodium bicarbonate and 50 ml. of methylene chloride. The methylene chloride layer is drawn off and the aqueous phase is extracted three times with methylene chloride. The combined extracts are washed until neutral with water, dried over magnesium sulfate and evaporated to give 200 mg. of oil. Trituration with ether-petroleum ether gives 130 mg. of crystals. Six crystallizations from acetone-petroleum ether gives 45 mg. of desired product: M.P. 239–241.5° C. $\lambda$ max. $^{239\,m\mu}$ ($\epsilon$16,500) (methanol).

Example VIII

PREPARATION OF 9β,11β-EPOXY-16α,17α,21-TRIHYDROXY-4-PREGNENE-3,20-DIONE

To a solution of 200 mg. of the compound prepared in Example VI in 20 ml. of methanol, cooled to 0° and flushed with nitrogen, is added a solution of 80 mg. of potassium hydroxide in 5 ml. of methanol. After standing for 1 hour at room temperature, the solution is neutralized with acetic acid and evaporated under reduced pressure at 35–40° C. The residue is dissolved in ethyl acetate, washed to neutral with water, dried over magnesium sulfate and evaporated to give 150 mg. of oil. Trituration with acetone-petroleum ether gives 50 mg. of crystalline product. Two crystallizations from acetone-petroleum ether raises the melt to 207.5–210.5° C. A mixed melting point determination with an authentic sample gives no depression. The infra-red spectrum is identical with that of the authentic sample.

Example IX

PREPARATION OF 9α-FLUORO-11β,16α,17α,21-TETRAHYDROXY-4-PREGNENE-3,20-DIONE

To a solution of 160 mg. of product prepared in Example VII in 20 ml. of methanol, cooled to 0° and flushed with nitrogen, is added a solution of 56 mg. of potassium hydroxide in 5 ml. of methanol. After standing for 1 hour at room temperature, the solution is neutralized with acetic acid and evaporated under reduced pressure at 35–40° C. The crystalline residue is slurried in water, filtered and washed well with water to yield 50 mg. of product: M.P. 203–236° C. The infra-red spectrum is identical with that of an authentic sample.

Example X

PREPARATION OF 16β,17α,21-TRIHYDROXY-4-PREGNENE-3,20-DIONE

A solution of 1.0 g. of 16β,21-diacetoxy-17α-hydroxy-4-pregnene-3,20-dione in 30 ml. of 0.27 N methanolic perchloric acid is allowed to stand overnight at room temperature and is then poured into water. The aqueous mixture is extracted with ethyl acetate. The combined extracts are washed with sodium bicarbonate until neutral, dried over sodium sulfate and evaporated to give an oil. The oil is partitioned on a diatomaceous earth column using the solvent system 7:1:2 methylene chloride, ethyl acetate, ethylene glycol. The latter part of hold back volume two is evaporated and the glycol residue to which water is added is extracted with ethyl acetate. The combined extracts are washed with water, dried and evaporated to give an oil which crystallized from methaol-ether. Two crystallizations gave 50 mg.; 196–201° C.

Example XI

PREPARATION OF 16β,17α,21-TRIHYDROXY-4-PREGNENE-3,20-DIONE

The latter part of hold back volume two in Example III is evaporated and the glycol residue to which water is added is extracted with ethyl acetate. The combined extracts are washed with water, dried and evaporated to give a solid which on slurrying with ether gave 120 mg.; M.P. 185–191° C. The infra-red spectrum of this sample is identical to that of the product of Example X.

The above solid (110 mg.) is dissolved in 1.5 ml. of pyridine and treated with 0.3 ml. of acetic anhydride overnight at room temperature. The acetylation mixture is poured into water and the resulting solid is removed by filtration. Crystallization from ether yields 45 mg.; M.P. 165–167° C. The infra-red spectrum is identical to that of an authentic sample of 16β,21-diacetoxy-17α-hydroxy-4-pregnene-3,20-dione. Mixed melting point determination with a previously characterized sample shows no depression.

Example XII

PREPARATION OF 16α,21-DIACETOXY-9α-FLUORO-11β,17α-DIHYDROXY-4-PREGNENE-3,20-DIONE

To a solution of 50 mg. of the product of Example IX in 2 ml. of pyridine is added 0.2 ml. of acetic anhydride. The solution is allowed to stand 17 hours at room temperature at which time it is poured into water and extracted with ethyl acetate. The combined extracts are washed several times with water, dried over magnesium sulfate and evaporated to give an oil which crystallized on treatment with ether. This gives 25 mg. of product. Three crystallizations from acetone-petroleum ether gives 17 mg. of pure product: M.P. 174–176° C. with decomposition: $\lambda_{max.}^{238-239\,m\mu}$ ($\epsilon$15,900) (methanol). The infra-red spectrum is identical to that of an authentic sample.

Example XIII

PREPARATION OF 16β,21-DIACETOXY-9α-FLUORO-11β,17α-DIHYDROXY-1,4-PREGNADIENE-3,20-DIONE

To a solution of 1.62 g. of the product of Example VII in 175 ml. of tertiary butanol is added 2 ml. of water. The solution is then flushed with nitrogen and evacuated on a water pump. This sequence is repeated three times to insure removal of all air. Selenium dioxide (2.0 g.) is added and the solution is heated to reflux under a stream of nitrogen and allowed to reflux for 23 hours, after which it is evaporated. The residue is dissolved in ethyl acetate, the insolubles are removed by filtration and the solution is washed with aqueous sodium bicarbonate and finally with water. After being dried over magnesium sulfate, the solution is evaporated and the residue is dissolved in 50 ml. of methanol. To the methanol solution is added 1 teaspoon of deactivated Raney nickel (prepared as follows: shake 3 teaspoons of Raney nickel with 300 ml. of 10% aqueous acetic acid for 15 minutes, decant the acid, shake with 200 ml. of water, decant the water, repeat the water treatment two more times, shake with ethanol and decant two times and finally shake with methanol and decant two times) and the mixture is shaken for 1 hour and filtered. The dark red solution is evaporated and the residue is dissolved in ethyl acetate. The ethyl acetate solution is washed twice with 10% aqueous acetic acid, then with sodium bicarbonate solution and finally with water until the washings are neutral. The solution is then dried over magnesium sulfate and evaporated to give 1.2 g. of yellow glass which is partitioned on a diatomaceous earth column using the system petroleum ether (B.P. 90–100° C.) (2 parts): ethyl acetate (3 parts): methanol (3 parts): water (2 parts). Hold-back volume two is evaporated to give 330 mg. of semi-solid which on treatment with acetone-petroleum ether gives 220 mg. of crystalline product. Three crystallizations from acetone-petroleum ether gives 55 mg. of pure product melting point 233.5–236° C. $\lambda_{max.}^{238\ m\mu}$ ($\epsilon$13,000) (methanol).

*Example XIV*

PREPARATION OF 9α-FLUORO-11β,16α,17α,21-TETRA-HYDROXY-1,4-PREGNADIENE-3,20-DIONE

To a solution of 275 mg. of the product of Example XIII in 20 ml. of methanol, cooled to 0° and flushed with nitrogen is added a solution of 100 mg. of potassium hydroxide in 5 ml. of methanol. After standing for 1 hour at room temperature, the solution is neutralized with acetic acid and evaporated under reduced pressure at 35–40° C. The residue is partitioned on a diatomaceous earth column using the system cyclohexane (5 parts): dioxane (4 parts): water (1 part). Hold-back volume two is evaporated to give a crystalline solid. The infra-red spectrum of this solid was identical to that of an authentic sample.

*Example XV*

PREPARATION OF 9α-FLUORO-11β,16α,17α,21-TETRA-HYDROXY-1,4-PREGNADIENE-3,20-DIONE

To a solution of 240 mg. of the product of Example XIII in 25 ml. of methanol, cooled to 0° and flushed with nitrogen is added a solution of 100 mg. of potassium hydroxide in 5 ml. of methanol. After standing for 1 hour at room temperature, the solution is neutralized with acetic acid and evaporated under reduced pressure at 35–40° C. The residue is partitioned on a diatomaceous earth column using the system petroleum ether (B.P. 90–100° C.) (3 parts): ethyl acetate (4 parts): methanol (3 parts): water (2 parts). Hold-back volume six is evaporated to give a crystalline solid. Crystallization from acetone-petroleum ether gives 20 mg. of desired product: melting point 265–268° C. A mixed melting point determination with an authentic sample of triamcinolone gives no depression. The infra-red spectrum is identical to that of the authentic sample.

To a solution of 25 mg. of triamcinolone prepared as above in 1 ml. of pyridine is added 0.5 ml. of acetic anhydride. After standing 15 hours at room temperature, the reaction mixture is evaporated and the crude residue is crystallized from acetone-petroleum ether to give the known triamcinolone diacetate, identical in all respects with an authentic sample.

*Example XVI*

PREPARATION OF 9α-FLUORO-11β,16β,17α,21-TETRA-HYDROXY-1,4-PREGNADIENE-3,20-DIONE

To a solution of 80 mg. of 16β,21-diacetoxy-9α-fluoro-11β,17α-dihydroxy-1,4-pregnadiene-3,20-dione in 3 ml. of methanol and 0.3 ml. of water at 10° C. is added 0.18 ml. of concentrated hydrochloric acid. After standing at room temperature for 17 hours, the reaction mixture is poured into water and extracted with ethyl acetate. The combined extracts are washed with water, dried and evaporated to give an oil which when purified by partition chromatography gives the desired product.

*Example XVII*

PREPARATION OF 9α-FLUORO-11β,16β,17α,21-TETRA-HYDROXY-4-PREGNENE-3,20-DIONE

To a solution of 100 mg. of 16β,21-diacetoxy-9α-fluoro-11β,17α-dihydroxy-4-pregnene-3,20-dione in 3 ml. of methanol and 0.3 ml. of water at 10° C. is added 0.2 ml. of concentrated hydrochloric acid. After standing at room temperature for 24 hours, the reaction mixture is poured into water and extracted with ethyl acetate. The combined extracts are washed with water, dried and evaporated to give an oil which when purified by partition chromatography gives the desired product.

*Example XVIII*

PREPARATION OF 16β,21-DIACETOXY-17α-HYDROXY-9α-FLUORO-4-PREGNENE-3,11,20-TRIONE

To a mixture of 180 mg. of chromic anhydride in 2 ml. of pyridine is added a solution of 200 mg. of 16β,21-diacetoxy-9α-fluoro-11β,17α-dihydroxy-4-pregnene-3,20-dione in 10 ml. of pyridine at 0°. The mixture is stirred at room temperature for 18 hours, poured into water and extracted with ethyl acetate. The combined extracts are washed until neutral with water, dried over magnesium sulfate and evaporated. The crude residue is crystallized from acetone-petroleum ether to give the desired product.

*Example XIX*

PREPARATION OF 16β,21-DIACETOXY-17α-HYDROXY-9α-FLUORO-1,4-PREGNADIENE-3,11,20-TRIONE

To a mixture of 160 mg. of chromic anhydride in 1.8 ml. of pyridine is added a solution of 180 mg. of 16β,21-diacetoxy-9α-fluoro-11β,17α-dihydroxy-1,4-pregnadiene-3,20-dione in 9 ml. of pyridine at 0°. The mixture is stirred at room temperature for 18 hours, poured into water and extracted with ethyl acetate. The combined extracts are washed until neutral with water, dried over magnesium sulfate and evaporated to give a semi-solid. Crystallization from acetone-petroleum ether gives the desired product.

We claim:

1. The compound 9α-bromo-16β,21-diacetoxy-11β,17α-dihydroxy-4-pregnene-3,20-dione.

2. The compound 16β,21-diacetoxy-17α-hydroxy-9β,11β-epoxy-4-pregnene-3,20-dione.

3. The compound 9α-fluoro-16β,21-diacetoxy-11β,17α-dihydroxy-4-pregnene-3,20-dione.

4. The compound 9α-fluoro-16β,21-diacetoxy-11β,17α-dihydroxy-1,4-pregnadiene-3,20-dione.

5. The compound 16β,21-diacetoxy-17α-hydroxy-9α-fluoro-4-pregnene-3,11,20-trione.

6. The compound 16β,21-diacetoxy-17α-hydroxy-9α-fluoro-1,4-pregnadiene-3,11,20-trione.

7. The compound 9α-fluoro-11β,16β,17α,21-tetrahydroxy-4-pregnene-3,20-dione.

8. The compound 9α-fluoro-11β,16β,17α,21-tetrahydroxy-1,4-pregnadiene-3,20-dione.

9. A compound having the formula:

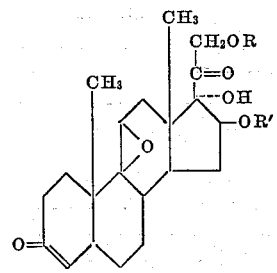

in which R and R' are selected from the group consisting of hydrogen and lower alkanoyl radicals.

10. A compound having the formula:

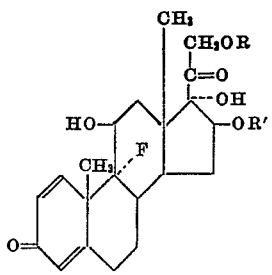

in which R and R' are selected from the group consisting of hydrogen and lower alkanoyl radicals.

11. A compound having the formula:

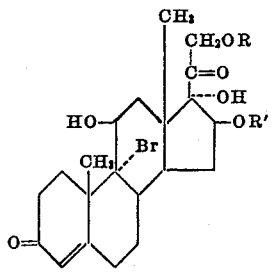

in which R and R' are selected from the group consisting of hydrogen and lower alkanoyl radicals.

12. A compound having the formula:

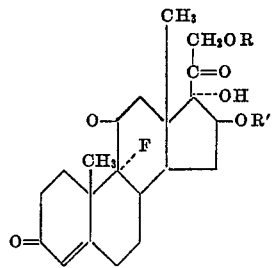

in which R and R' are selected from the group consisting of hydrogen and lower alkanoyl radicals.

13. A compound having the formula:

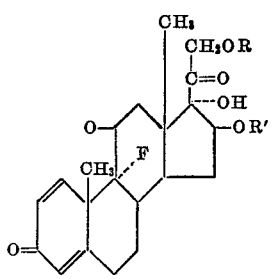

in which R and R' are selected from the group consisting of hydrogen and lower alkanoyl radicals.

14. A compound having the formula:

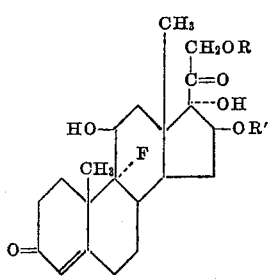

in which R and R' are selected from the group consisting of hydrogen and lower alkanoyl radicals.

References Cited in the file of this patent

UNITED STATES PATENTS

| | | |
|---|---|---|
| 2,727,907 | Chinn et al. | Dec. 20, 1955 |
| 2,789,118 | Bernstein et al. | Apr. 16, 1957 |
| 2,889,344 | Bergstrom | June 2, 1959 |

OTHER REFERENCES

Heusler et al.: Chem. Ber., vol. 87, No. 9 (1954), pages 1301–1312 (pages 1303 and 1310 necessary).

Bernstein et al.: J. Am. Chem. Soc., vol. 81 (Mar. 5, 1959), page 1256.

UNITED STATES PATENT OFFICE
Certificate of Correction

Patent No. 2,993,042　　　　　　　　　　　　　　　　　　July 18, 1961

Seymour Bernstein et al.

It is hereby certified that error appears in the above numbered patent requiring correction and that the said Letters Patent should read as corrected below.

Column 2, lines 18 to 28, strike out Formula VI and insert instead the following:

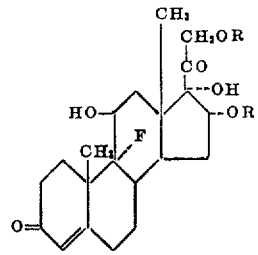

same lines 18 to 28, strike out Formula VIII and insert instead the following:

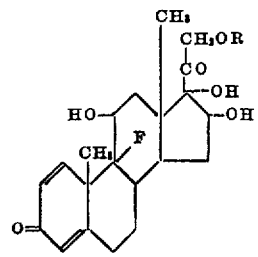

lines 49 to 60, strike out the formula and insert instead the following:

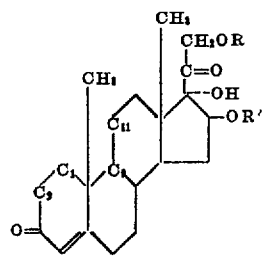

column 3, lines 3 to 7, strike out the second formula and insert instead the following:

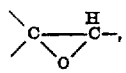

same lines 3 to 7, strike out the third formula and insert instead the following:

lines 9 to 11, strike out the formula and insert instead the following:

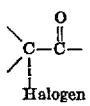

column 8, lines 63 to 73, strike out the formula and insert instead the following:

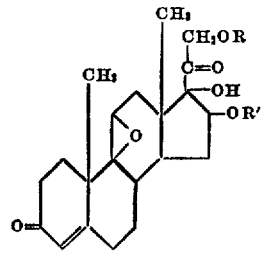

column 9, lines 32 to 42, strike out the formula and insert instead the following:

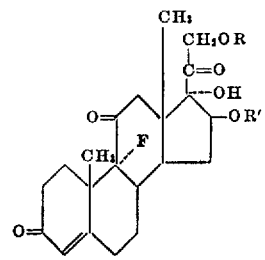

column 10, lines 3 to 12, strike out the formula and insert instead the following:

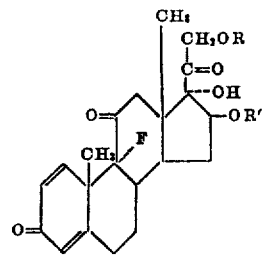

Signed and sealed this 5th day of December 1961.

[SEAL]

Attest:
ERNEST W. SWIDER,
*Attesting Officer.*

DAVID L. LADD,
*Commissioner of Patents.*